US009304849B2

(12) United States Patent
Arroyo et al.

(10) Patent No.: US 9,304,849 B2
(45) Date of Patent: Apr. 5, 2016

(54) IMPLEMENTING ENHANCED ERROR HANDLING OF A SHARED ADAPTER IN A VIRTUALIZED SYSTEM

(71) Applicant: International Business Machines Corporation, Armonk, NY (US)

(72) Inventors: Jesse P. Arroyo, Rochester, MN (US); Charles S. Graham, Rochester, MN (US); John R. Oberly, III, Rochester, MN (US); Timothy J. Schimke, Stewartville, MN (US)

(73) Assignee: International Business Machines Corporation, Armonk, NY (US)

( * ) Notice: Subject to any disclaimer, the term of this patent is extended or adjusted under 35 U.S.C. 154(b) by 360 days.

(21) Appl. No.: 13/915,943

(22) Filed: Jun. 12, 2013

(65) Prior Publication Data

US 2014/0372789 A1  Dec. 18, 2014

(51) Int. Cl.
| | |
|---|---|
| *G06F 11/07* | (2006.01) |
| *G06F 9/455* | (2006.01) |
| *G06F 11/14* | (2006.01) |
| *G06F 9/445* | (2006.01) |

(52) U.S. Cl.
CPC ........ *G06F 11/0793* (2013.01); *G06F 9/45558* (2013.01); *G06F 11/0712* (2013.01); *G06F 11/0778* (2013.01); *G06F 11/14* (2013.01); *G06F 9/445* (2013.01); *G06F 11/0772* (2013.01); *G06F 2009/45579* (2013.01); *G06F 2009/45591* (2013.01)

(58) Field of Classification Search
CPC .......................... G06F 11/0712; G06F 11/0778
See application file for complete search history.

(56) References Cited

U.S. PATENT DOCUMENTS

| | | | |
|---|---|---|---|
| 5,875,310 | A | 2/1999 | Buckland et al. |
| 6,122,289 | A | 9/2000 | Brown et al. |
| 6,311,326 | B1 | 10/2001 | Shagam |
| 7,231,493 | B2 | 6/2007 | Nguyen et al. |

(Continued)

FOREIGN PATENT DOCUMENTS

EP  1130501 A1  9/2001

OTHER PUBLICATIONS

Bhosale, Shivaji D. et al., "IBM Power Systems SR-IOV Technical Overview and Introduction", REDP-5065-00, International Business Machines Corporation, May 20, 2014, pp. 1-71.

(Continued)

*Primary Examiner* — Albert Decady
*Assistant Examiner* — Paul Contino
(74) *Attorney, Agent, or Firm* — Joan Pennington

(57) ABSTRACT

A method, system and computer program product are provided for implementing enhanced error handling for a hardware I/O adapter, such as a Single Root Input/Output Virtualization (SRIOV) adapter, in a virtualized system. The hardware I/O adapter is partitioned into multiple endpoints, with each Partitionable Endpoint (PE) corresponding to a function, and there is an adapter PE associated with the entire adapter. The endpoints are managed both independently for actions limited in scope to a single function, and as a group for actions with the scope of the adapter. An error or failure of the adapter PE freezes the adapter PE and propagates to the VF PEs associated with the adapter, causing the VF PEs to be frozen. An adapter driver and VF device drivers are informed of the error, and start recovery. The hypervisor locks out the VF device drivers at key points enabling adapter recovery to successfully complete.

20 Claims, 7 Drawing Sheets

(56) References Cited

U.S. PATENT DOCUMENTS

| | | | |
|---|---|---|---|
| 7,757,129 | B2 | 7/2010 | Bohizic et al. |
| 7,770,073 | B2 | 8/2010 | Fashchik et al. |
| 8,141,092 | B2 | 3/2012 | Brown et al. |
| 8,261,242 | B2 | 9/2012 | Booth et al. |
| 8,358,661 | B2 | 1/2013 | Armstrong et al. |
| 8,359,415 | B2 | 1/2013 | Brown et al. |
| 8,375,363 | B2 | 2/2013 | Zhou et al. |
| 8,418,166 | B2 | 4/2013 | Armstrong et al. |
| 8,447,891 | B2 | 5/2013 | Brownlow et al. |
| 9,135,101 | B2 * | 9/2015 | Prabhakaran ....... G06F 11/0757 |
| 2002/0161907 | A1 | 10/2002 | Moon |
| 2003/0037275 | A1 | 2/2003 | Bakke et al. |
| 2004/0049710 | A1 * | 3/2004 | Ashmore et al. .............. 714/5 |
| 2004/0260981 | A1 | 12/2004 | Kitamorn et al. |
| 2008/0147904 | A1 | 6/2008 | Freimuth et al. |
| 2009/0133028 | A1 * | 5/2009 | Brown et al. ............. 718/104 |
| 2009/0144731 | A1 | 6/2009 | Brown et al. |
| 2009/0178033 | A1 | 7/2009 | Challener et al. |
| 2009/0313391 | A1 * | 12/2009 | Watanabe .......... G06F 9/45558 710/8 |
| 2010/0115049 | A1 | 5/2010 | Matsunaga et al. |
| 2010/0146170 | A1 * | 6/2010 | Brown et al. ............. 710/105 |
| 2011/0040860 | A1 | 2/2011 | DeCusatis et al. |
| 2012/0102490 | A1 * | 4/2012 | Eide et al. ................. 718/1 |
| 2012/0124572 | A1 * | 5/2012 | Cunningham ...... G06F 9/45558 718/1 |
| 2012/0137288 | A1 | 5/2012 | Viswanath |
| 2012/0151472 | A1 | 6/2012 | Koch et al. |
| 2012/0159245 | A1 * | 6/2012 | Brownlow et al. ............. 714/23 |
| 2012/0179932 | A1 | 7/2012 | Armstrong et al. |
| 2012/0180047 | A1 | 7/2012 | Cardona et al. |
| 2012/0180048 | A1 | 7/2012 | Brownlow et al. |
| 2012/0185632 | A1 | 7/2012 | Lais et al. |
| 2012/0246644 | A1 * | 9/2012 | Hattori et al. ................ 718/1 |
| 2012/0254862 | A1 * | 10/2012 | Dong ................... G06F 9/4856 718/1 |
| 2012/0297379 | A1 | 11/2012 | Anderson et al. |
| 2012/0317548 | A1 | 12/2012 | Olsa et al. |
| 2013/0054507 | A1 | 2/2013 | Das et al. |
| 2013/0275972 | A1 * | 10/2013 | Sawa et al. ................ 718/1 |
| 2014/0250338 | A1 * | 9/2014 | Prabhakaran et al. .......... 714/56 |

OTHER PUBLICATIONS

Ko, Mike et al., "Virtual Ethernet Bridging", International Business Machines Corporation, Jul. 2008, pp. 1-11.

Power 7 Information, Virtualizing Power Systems Servers, International Business Machines Corporation, Apr. 29, 2014.

Emulex, "Single Root I/O Virtualization (SR-IOV)", Version 3.1 User's Guide, P007978-01A Rev. A, 2012, pp. 1-5.

Varma, Anujan, "Single Root IOV Endpoint Implementation", PCI-SIG Developers Conference 2007, PCI-SIG, May 21, 2007, pp. 1-36.

International Search Report and Written Opinion of the ISA dated Jul. 8, 2014—International Application No. PCT/JP2014/002914.

Netronome; "Standardized but Flexible I/O for Self-Virtualizing Devices"; WTOV'08 Proceedings of the First Conference on I/O Virtualization; p. 9-9; 2008.

Broadcom; "Broadcom Ethernet Network Controller Enhanced Virtualization Functionality"; http://www.broadcom.com/press/release.php?id=1197764; White Paper; Oct. 2009.

Challa, NR.; "Hardware Based I/O Virtualization Technologies for Hypervisors, Configurations, and Advantages—A Study"; Proceedings of the 2012 IEEE International Conference on Cloud Computing in Emerging Markets (CCEM), 5 pp.; IEEE; 2012.

Kirk Glerum et al., "Debugging in the (Very) Large: Ten Years of Implementation and Experience", Microsoft Corporation, 2009.

Nithya Ramanathan et al., "Sympathy for the Sensor Network Debugger", UCLA Center for Embedded Network Sensing, 2005.

* cited by examiner

IMPLEMENTING ENHANCED ERROR HANDLING OF A SHARED ADAPTER IN A VIRTUALIZED SYSTEM

FIELD OF THE INVENTION

The present invention relates generally to the data processing field, and more particularly, relates to a method, system and computer program product for implementing enhanced error handling (EEH) for a hardware I/O adapter, such as a Single Root Input/Output Virtualization (SRIOV) adapter, in a virtualized system.

DESCRIPTION OF THE RELATED ART

Single root input/output (TO) virtualization (SRIOV) is a PCI standard, providing an adapter technology building block for I/O virtualization within the PCI-Express (PCIe) industry. SRIOV capability is a feature of many new PCIe adapters for Fibre Channel, Ethernet, Infiniband, and Converged Network Adapters (CNA).

The SRIOV adapter has an I/O adapter virtualization architecture that allows a single I/O adapter to be concurrently shared across many different logical partitions. The sharing is done at a physical level, so that each logical partition has access to a slice of the physical adapter. The sharing is accomplished via partitioning the adapter into many different PCI functions, and then distributing access to those functions. The adapter is presented as one or more physical functions (PFs) that control functions, for example used for both configuration and I/O, and a set of virtual functions (VFs), used for I/O and limited configuration, each VF represents a slice of the adapter capacity that can be assigned to a logical partition independently of other VFs. Each logical partition has a device driver for each of the VFs assigned to the logical partition.

With a shared hardware I/O adapter, such as the SRIOV adapter, error recovery of the shared adapter is now required to be coordinated between many partitions. Prior solutions only required coordination within a single partition, thus a new solution is required.

A need exists for an effective mechanism to enable enhanced error handling (EEH) for a shared hardware I/O adapter or a Single Root Input/Output Virtualization (SRIOV) adapter in a virtualized system. It is desirable that such mechanism enables effective and efficient error handling operations to cover the multiple partitions.

SUMMARY OF THE INVENTION

Principal aspects of the present invention are to provide a method, system and computer program product for implementing enhanced error handling (EEH) for a hardware I/O adapter, such as a Single Root Input/Output Virtualization (SRIOV) adapter, in a virtualized system. Other important aspects of the present invention are to provide such method, system and computer program product substantially without negative effects and that overcome many of the disadvantages of prior art arrangements.

In brief, a method, system and computer program product are provided for implementing enhanced error handling for a hardware I/O adapter, such as a Single Root Input/Output Virtualization (SRIOV) adapter, in a virtualized system. The hardware I/O adapter is partitioned into multiple endpoints, with each Partitionable Endpoint (PE) corresponding to a function, and there is an adapter PE associated with the entire adapter. The endpoints are managed both independently for actions limited in scope to a single function, and as a group for actions with the scope of the adapter. An error or failure of the adapter PE freezes the adapter PE and propagates to the VF PEs associated with the adapter, causing the VF PEs to be frozen. An adapter driver and VF device drivers are informed of the error, and start recovery. The hypervisor locks out the VF device drivers at key points enabling adapter recovery to successfully complete.

In accordance with features of the invention, a failure of a VF PE causes a failure of just that single PE, and is handled in isolation.

In accordance with features of the invention, the VF device driver learns of the error and starts recovery and the VF driver is blocked in the initial recovery steps with the VF PEs remaining frozen until the adapter driver completes the adapter recovery. The adapter driver unfreezes the adapter PE, collects error data, and starts recovery and reinitialization, and the VF PE remains frozen. The adapter driver recovers the adapter, resets the VFs, and recovers the previous configuration of the adapter. The adapter driver gives permission for the unfreeze of the VF PEs and VF drivers commence recovery.

In accordance with features of the invention, no coordination is required between the adapter driver and VF device drivers, or among the VF device drivers. The VF device drivers can progress independently, and complete recovery independently.

In accordance with features of the invention, multiple levels of isolation are provided. A first level of isolation includes errors scoped to a single VF. In that case only the single PE for the single VF is frozen and recovered. A second level of isolation includes at least one error scoped to the entire adapter. In that case all PEs are frozen and recovered, this includes the adapter PE and each of the VF PEs.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

In the following detailed description of embodiments of the invention, reference is made to the accompanying drawings, which illustrate example embodiments by which the invention may be practiced. It is to be understood that other embodiments may be utilized and structural changes may be made without departing from the scope of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In accordance with features of the invention, a method, system and computer program product are provided for implementing enhanced error collection for a hardware I/O adapter, such as a Single Root Input/Output Virtualization (SRIOV) adapter, in a virtualized system.

Figure 1:
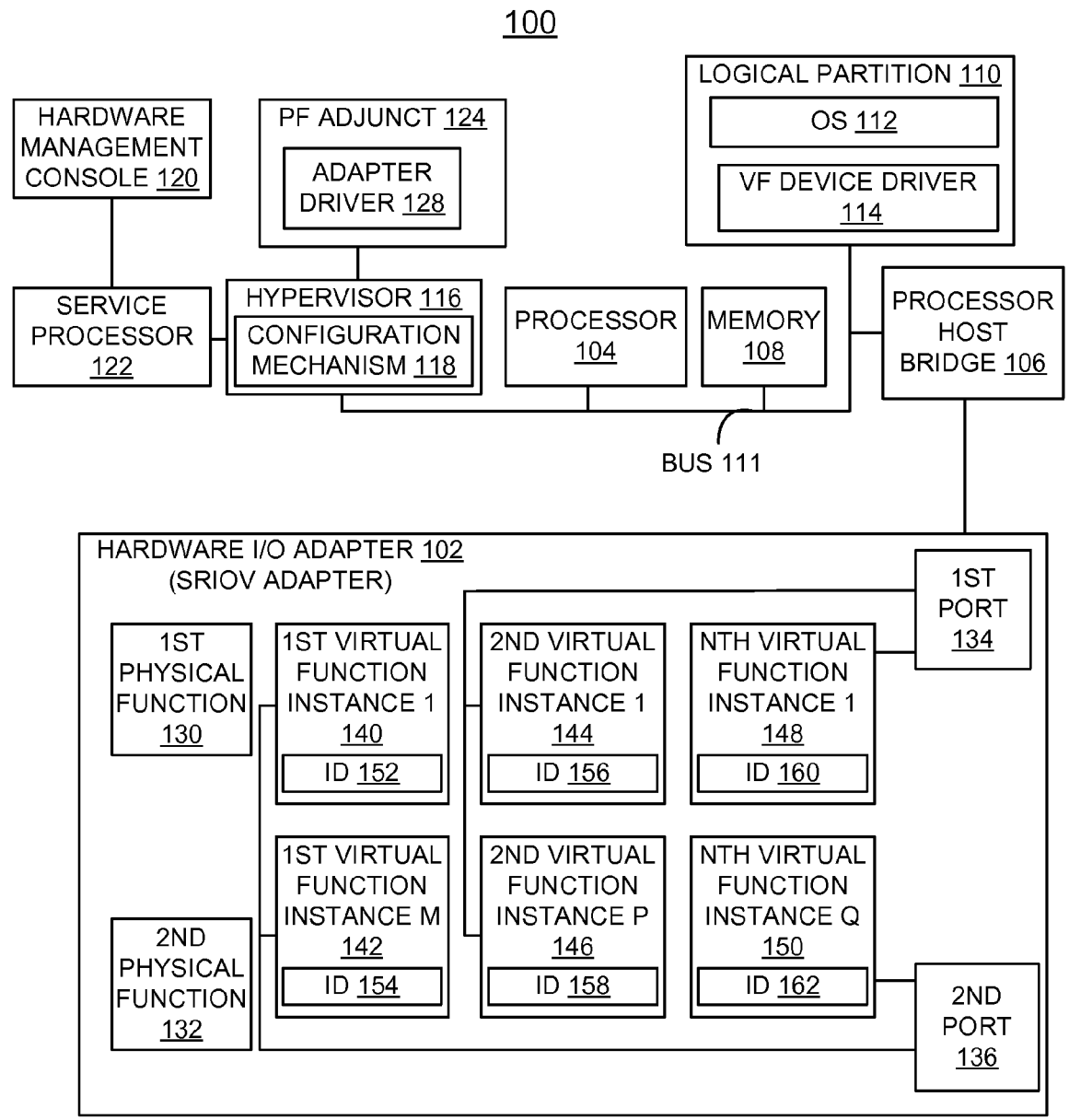
FIGS. 1, and 2 illustrates a respective example computer system and example system for implementing enhanced error handling for a hardware I/O adapter, such as a Single Root Input/Output Virtualization (SRIOV) adapter, in accordance with the preferred embodiment.

Having reference now to the drawings, in FIG. 1, there is shown an example computer system generally designated by the reference character 100 for implementing enhanced error collection for a hardware I/O adapter 102 or Single Root Input/Output Virtualization (SRIOV) adapter 102 in accordance with the preferred embodiment. Computer system 100 includes one or more processors 104, or central processor units (CPUs) 104 (one shown) coupled by an I/O hub or processor host bridge 106 to the Single Root Input/Output Virtualization (SRIOV) adapter or hardware I/O adapter 102. The processor host bridge (PHB) 106 provides multiple PE (Partitionable Endpoint) support in accordance with the preferred embodiment.

Computer system 100 includes a memory 108 and one or more logical partitions (LPARs) 110 (one shown) coupled by a system bus 111 to the processor 104 and the processor host bridge 106. Each operating system (OS) 112 resides in its own LPAR 110, with each LPAR allocated a part of a physical processor 104, an entire physical processor, or multiple physical processors from the computer 100. A VF device driver 114 is provided with the logical partition (LPAR) 110. A portion of the memory 108 is allocated to each LPAR 110. Computer system 100 includes a hypervisor 116 including a configuration mechanism 118. The hypervisor 116 is a part of the system firmware and manages the allocation of resources to each operating system 112 and LPAR 110.

As shown, a hardware management console (HMC) 120 used, for example, to manage system functions including logical partition configuration and hardware virtualization, is coupled to the hypervisor 116 via a service processor 122. Computer system 100 includes a physical function (PF) manager or PF adjunct 124 provided with the hypervisor 116. The PF adjunct 124 includes an adapter driver 128 to manage physical functions of the hardware I/O adapter 102. The hypervisor 116 uses the PF adjunct 124, for example, to configure physical functions (PFs) and virtual functions (VFs) of the hardware I/O adapter 102 based on configuration information provided by a system administrator via the hardware management console 120.

As shown, the hardware I/O adapter 102 includes, for example, a first physical function 130, a second physical function 132, a first port 134, and a second port 136. The hypervisor 116 using the PF adjunct 124 configures virtual functions based on the physical functions 130, 132 and associates virtual functions with one or more of the ports 134, 136 of the hardware I/O adapter 102.

For example, a first virtual function, 140, instance 1, and the Mth instance of the first virtual function 142, where M is greater than 1, are associated with the second port 136. As shown, a second virtual function 144, such as the first instance of the second virtual function 144 and the Pth instance of the second virtual function 146, where P is greater than 1, are associated with the first port 134. As shown, multiple instances of an Nth virtual function, where N is greater than 2, such as the first instance of the Nth virtual function 148 is associated with the first port 134 and the Qth instance of the Nth virtual function 150, where Q is greater than 1, is associated with the second port 136.

Each instance of the first virtual function 140, 142, the second virtual function 144, 146, and Nth virtual function 148, 150 are hosted by a physical function, such as one of the first physical function 132, the second physical function 132, and another physical function (not shown).

Each instance of the first virtual function 140, 142, the second virtual function 144, 146, and Nth virtual function 148, 150 includes a respective virtual function identifier (ID), shown as ID 152, ID 154, ID 156, ID 158, ID 160, and ID 162. Each virtual function identifier uniquely identifies a particular virtual function that is hosted by the hardware I/O adapter 102. For example, when a message (not shown) is routed to a particular virtual function, the message includes the identifier associated with the particular virtual function.

In accordance with features of the invention, the PHB 106 with multiple PE support turns a single physical adapter into multiple independent PCI endpoints. These endpoints can then be managed independently by the different partitions. Each VF 140, 142, 144, 146, 148, 150 is a unique PE. Additionally, there is a PE associated with the entire adapter 102. A failure of a VF PE causes a failure of just that single PE, and advantageously is handled in isolation. A failure of the adapter PE propagates to the VF PEs associated with the adapter, causing them to be failed also.

A Partitionable Endpoint (PE) is a separately assignable I/O unit. That is, any part of an I/O subsystem that can be assigned a logical partition independent of another PE. Each PE has independent domains (addressing, error, state, and the like) to provide PE level error isolation, detection, and recovery.

In accordance with features of the invention, the hypervisor 116 provides base support for managing the specific PEs. The adapter driver 128 associating the PEs with specific functions and partitions, provides sequences error recovery across the entire adapter 102, controls when the VFs 140, 142, 144, 146, 148, 150 are allowed to commence recovery, and manages the PFs 130, 132. VF device driver 114 handles VF error recovery, for example using the same sequence as is followed for a non-shared adapter.

Computer system 100 is shown in simplified form sufficient for understanding the present invention. The illustrated computer system 100 is not intended to imply architectural or functional limitations. The present invention can be used with various hardware implementations and systems and various other internal hardware devices.

Figure 2:
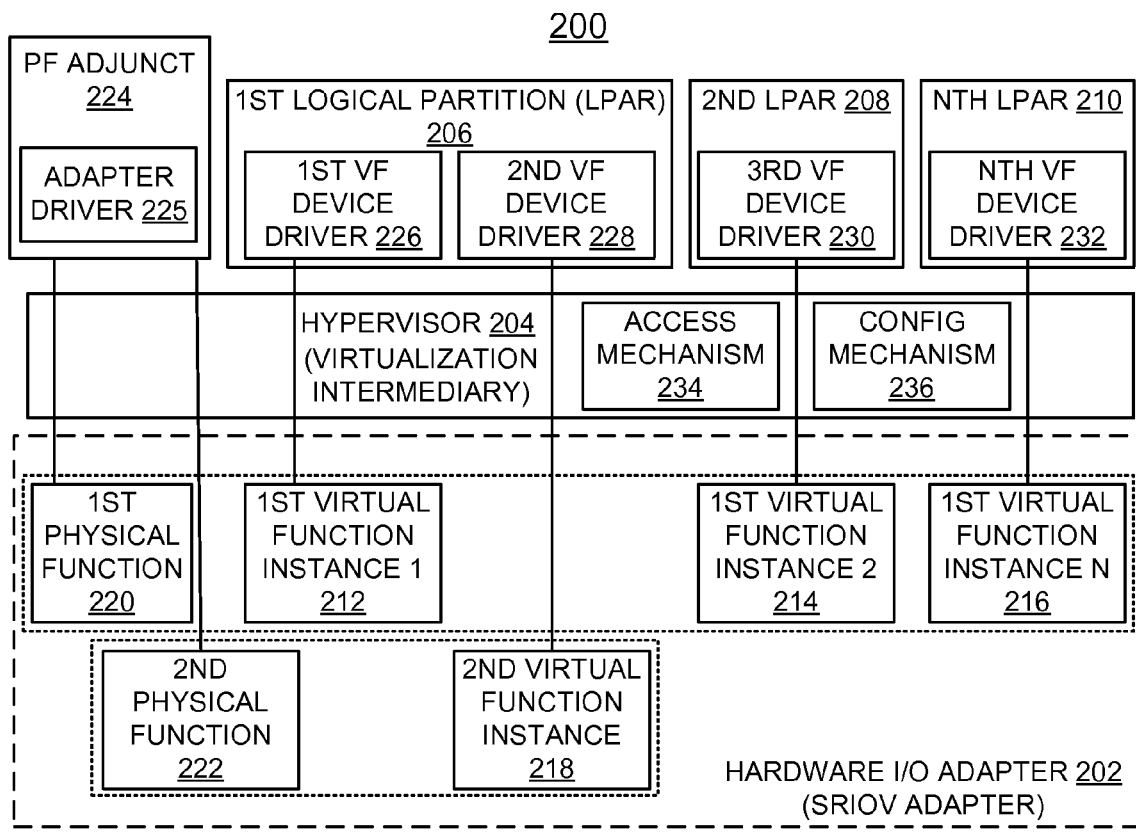

Referring to FIG. 2, there is shown another example system generally designated by the reference character 200 for implementing distributed debug data collection and analysis for a hardware I/O adapter or Single Root Input/Output Virtualization (SRIOV) adapter 202 in accordance with the preferred embodiment.

System 200 includes a hypervisor 204 or other virtualization intermediary, used to enable multiple logical partitions to access virtual functions provided by hardware that includes the hardware I/O adapter 202. For example, as shown in FIG. 2, the hypervisor 204 is used to enable a first logical partition 206, a second logical partition 208, and an Nth logical partition 210, to access a plurality of virtual functions 212, 214, 216, 218 that are provided by the hardware I/O adapter 202. For example, the hypervisor 204 used a first physical function 220 of the hardware I/O adapter 202 to provide a first instance of a first virtual function 212, a second instance of a first virtual function 214, and an Nth instance of a first virtual function 216 to the logical partitions 206, 208, 210. As shown the hypervisor 204 uses a second physical function 222 of the hardware I/O adapter 202 to provide a second virtual function 218 to the logical partitions 206, 208, 210.

The physical functions 220, 222 advantageously include PCI functions, supporting single root I/O virtualization capabilities. Each of the virtual functions 212, 214, 216, 218 is associated with one of the physical functions 220, 222 and adapted to share one or more physical resources of the hardware I/O adapter 202.

Software functions or modules, such as a physical function (PF) adjunct 224 including an adapter driver 225, is provided with the hypervisor 204 for managing the physical functions 220, 222 and the virtual functions 212, 214, 216, 218. For example, a user may specify a particular configuration and the hypervisor 204 uses the PF adjunct 224 to configure the virtual functions 212, 214, 216, 218 from the physical functions 220, 222.

For example, in operation, the hypervisor 204 with the PF adjunct 224 enables the first virtual function instances 212, 214, 216 from the first physical function 220. The hypervisor 204 with the PF adjunct 224 enables the second virtual function 218 from the second physical function 222. The virtual functions 212, 214, 216, 218 are enabled, for example, based on a user provided configuration. Each of the logical partitions 206, 208, 210 may execute an operating system (not shown) and client applications (not shown).

As shown, the client applications that execute at the logical partitions 206, 208, 210 perform virtual input/output operations and include a respective device driver to directly manage an associated virtual function. For example, a first client application executing at the first logical partition 206 may include a first client VF device driver 226, and a second client application executing at the first logical partition 206 may include a second client VF device driver 228.

As shown, the first client VF device driver 226 accesses the first instance of the first virtual function 212. The second client virtual VF device driver 228 accesses the second virtual function 218. A third client VF device driver 230 executing at the second logical partition 208 accesses the second instance of the first virtual function 214. An Nth client VF device driver 232 executing at the Nth logical partition 210 accesses the Nth instance of the first virtual function 216. An access mechanism 234 and a configuration mechanism 236 are provided with the hypervisor 204 to associate a logical partition with an accessed virtual function. The hypervisor 204 uses the access mechanism 234 to enable logical partitions, such as LPAR 206 to access configuration space associated with one or more of the virtual functions 212, 214, 216, 218.

In accordance with features of the invention, the hardware I/O adapter is partitioned into multiple endpoints, with each Partitionable Endpoint (PE) corresponding to a function, and there is an adapter PE associated with the entire adapter. The endpoints are managed both independently for actions limited in scope to a single function, and as a group for actions with the scope of the adapter. An error or failure of the adapter PE freezes the adapter PE and propagates to the VF PEs associated with the adapter, causing the VF PEs to be frozen. An adapter driver and VF device drivers are informed of the error, and start recovery. The hypervisor locks out the VF device drivers at key points enabling adapter recovery to successfully complete.

In accordance with features of the invention, the adapter driver unfreezes its PE, collects error data, and starts recovery/reinitialization, and the VF PEs remains frozen. The adapter driver recovers the adapter, resets the VFs, and restores the previous configuration of the adapter. The adapter driver gives permission for the unfreeze of the VF PEs and the VF drivers commence recovery.

System 200 is shown in simplified form sufficient for understanding the present invention. The illustrated system 200 is not intended to imply architectural or functional limitations. The present invention can be used with various hardware implementations and systems and various other internal hardware devices.

In accordance with features of the invention, enhanced error handling (EEH) optionally is entered via the HW detecting an error and freezing the adapter PE along with the child PEs. The same sequence can also be initiated from a number of other causes, this is just one example.

Referring to FIGS. 3, 4, 5 and 6, there are shown exemplary operations of the processing and logic provided by the hypervisor 130 for implementing enhanced error handling (EEH) for a hardware I/O adapter in accordance with the preferred embodiment.

Figure 3:
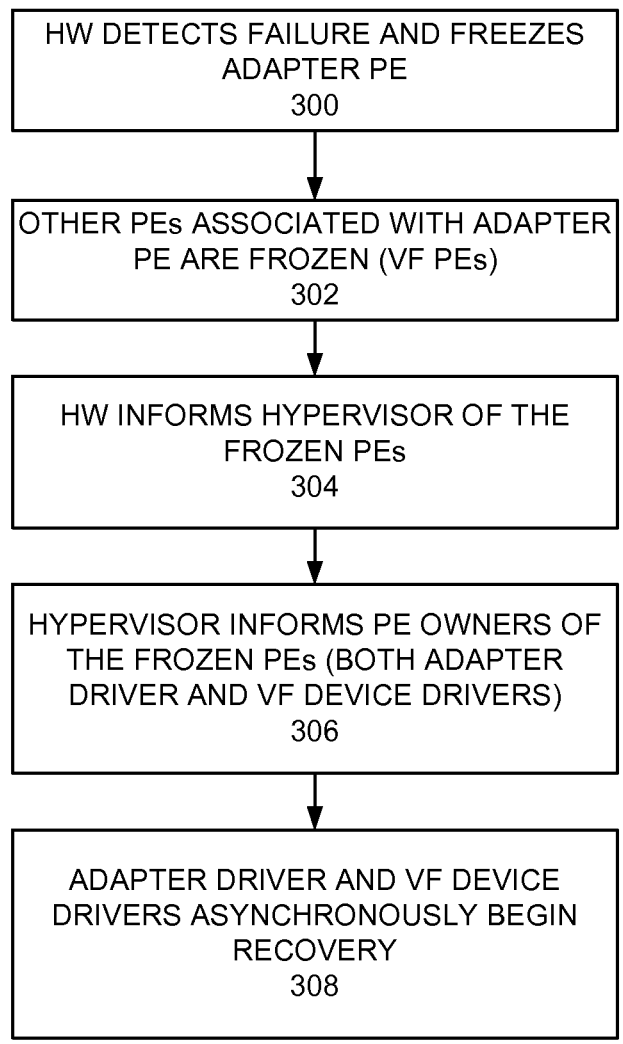
FIGS. 3, 4, 5, and 6 provide a respective flow chart illustrating exemplary operations for implementing enhanced error handling for the SRIOV adapter in accordance with the preferred embodiment.

In FIG. 3, as indicated in a block 300, HW detects a failure and freezes the adapter PE. As indicated in a block 302, other PEs associated with the adapter PE are frozen, such as VF PEs. As indicated in a block 304, the HW informs the hypervisor of the frozen PEs. The hypervisor informs PE owners of the frozen PEs including both the adapter driver and VF device drivers as indicated in a block 306. The adapter driver and VF device drivers asynchronously begin recovery as indicated in a block 308.

Figure 4:
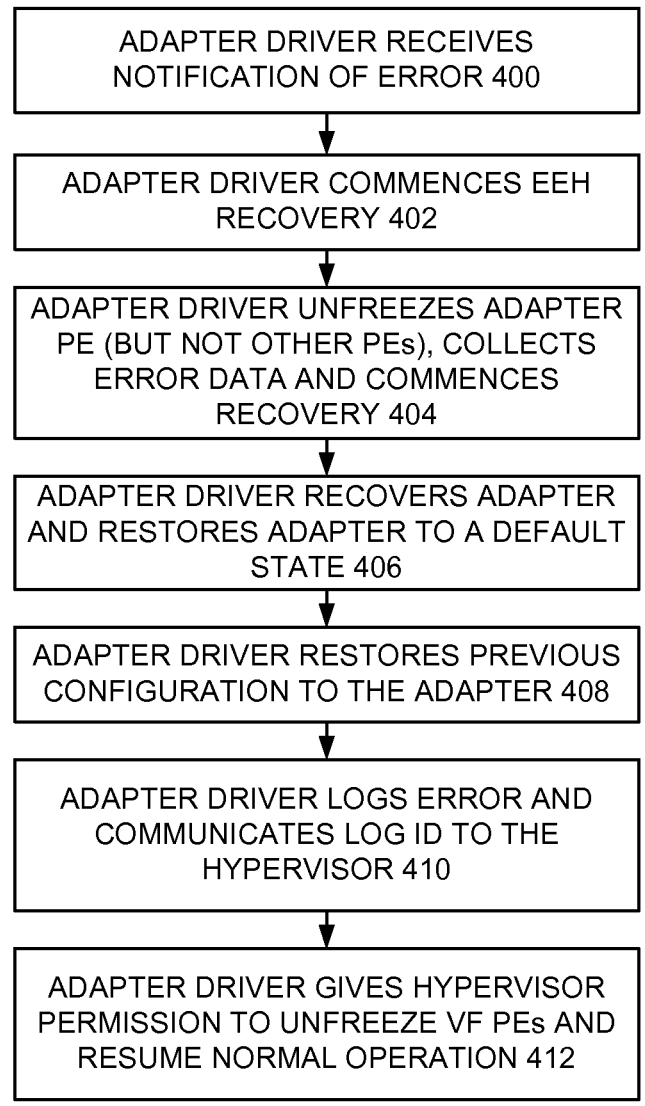

Referring now to FIG. 4, as indicated in a block 400, the adapter driver receives notification of the error. The adapter driver commences EEH recovery as indicated in a block 402. The adapter driver unfreezes the adapter PE but not other PEs, collects error data, and commences recovery as indicated in a block 404.

As indicated in a block 406, the adapter driver recovers the adapter. This may involve a reset of the entire adapter, which also resets the VFs. The adapter is then reinitialized to the default state at block 406. As indicated in a block 408, the adapter driver replays the previous configuration to the adapter. This is the same configuration as before, since the VFs need to come back similar to what was previously there, such as with the same PCI BAR spaces or VF BAR registers, and the like. Then the adapter driver logs error and communicates a Log ID to the hypervisor as indicated in a block 410. As indicated in a block 412, the adapter driver gives the hypervisor permission to unfreeze VF PEs and resumes normal operation.

Figure 5:
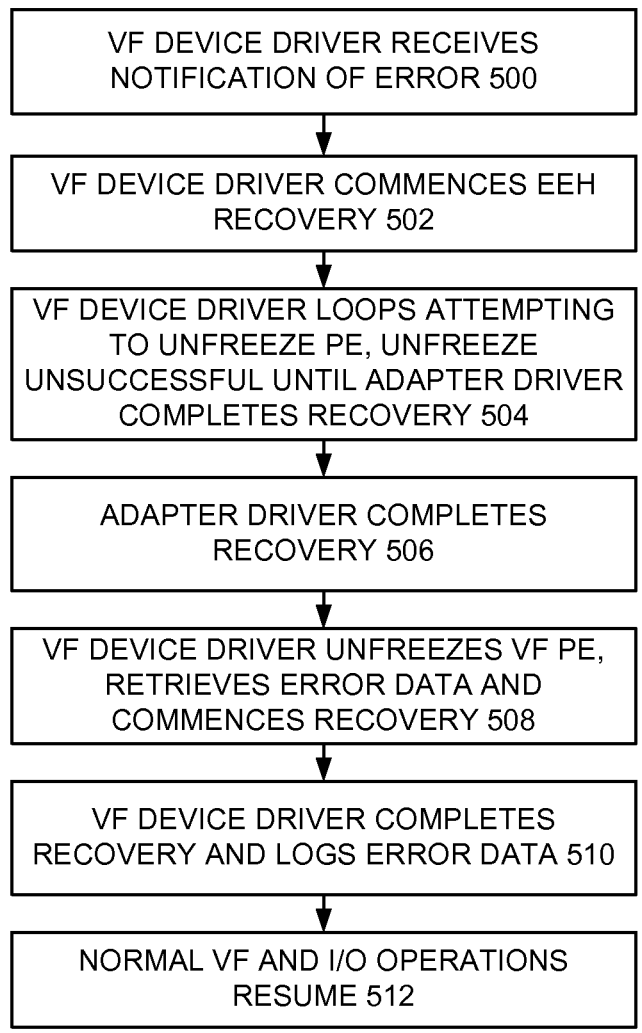

Referring now to FIG. 5, as indicated in a block 500, the VF device driver receives notification of the error. The VF device driver commences EEH recovery as indicated in a block 502. The VF device driver loops attempting to unfreeze the PEs, while the unfreeze is unsuccessful until the adapter driver completes recovery as indicated in a block 504. The adapter driver completes recovery as indicated in a block 506. The VF device driver unfreezes the PE, retrieves error data, and commences recovery as indicated in a block 508. The VF device driver completes recovery and logs error data as indicated in a block 510. Then normal VF and I/O operations resume as indicated in a block 512.

In accordance with features of the invention, enhanced error handling (EEH) optionally includes two levels of isolation, such as illustrated in FIGS. 3, 4, and 5. The first level of isolation includes errors scoped to a single VF. In that case only the single PE for the single VF is frozen and recovered. The second level of isolation includes errors scoped to the entire adapter. In that case all PEs are frozen and recovered, this includes the adapter PE and also each of the VF PEs.

In accordance with features of the invention, enhanced error handling (EEH) optionally includes additional intermediate groupings. This adds additional levels to the hierarchy.

The advantage of this is finer-grained recovery. The recovery action is less intrusive, and fewer VFs are impacted. For example, some errors might be scoped to a single physical port. In that case, recovery might encompass freezing the set of PEs associated with the VFs using that physical port. In another example, errors might be scoped to a single I/O protocol, for example in a Converged Network Adapter (CNA) implementing both Network Interface Controller (NIC) and Fibre Channel over Ethernet (FCoE), an error might impact only FCoE. In that case, recovery might encompass freezing the set of PEs associated with VFs using that protocol, while not freezing PEs for VFs running different protocols.

In accordance with features of the invention, enhanced error handling (EEH) optionally includes multiple and potential overlapping groups of PEs. Continuing the above examples, there might be groupings for all PEs on a single port, all FCoE PEs on that port, and also all NIC PEs on that same port. Further there might also be additional groupings of all FCoE PEs across all ports of the adapter. The exact details of the groupings used are determined by the level of isolation provided by the adapter vendor for recovery. Allowing various groupings by the adapter driver allows for maximum error isolation with the minimum number of VF PEs impacted. Note that the recovery by the VF driver is independent of the groupings used, as the VF driver is acting on only a single VF.

Figure 6:
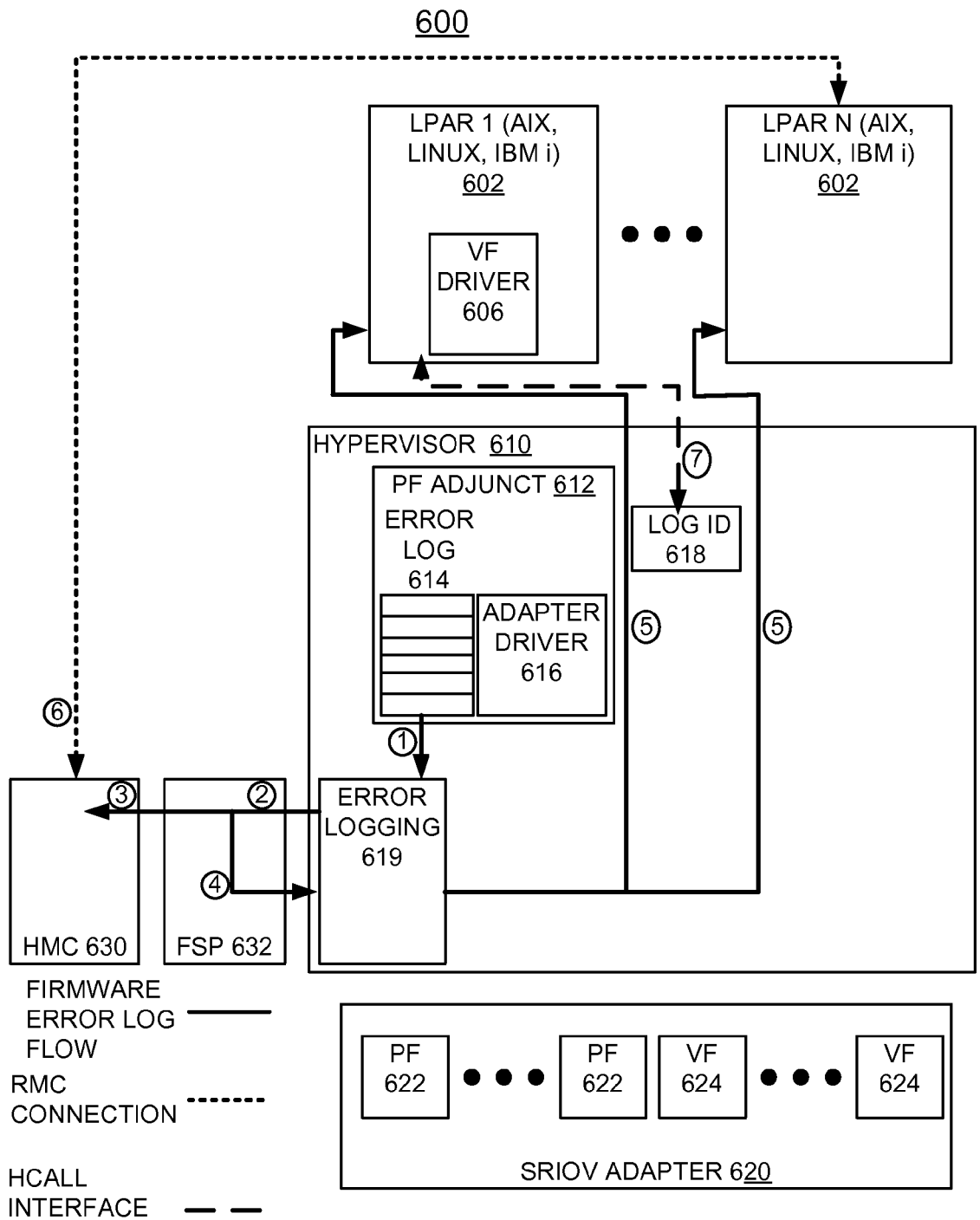

Referring now to FIG. 6, there is shown an example apparatus generally designated by reference character 600 for illustrating example high level error log flow for adapter or PF initiated error logs. As shown in FIG. 6, apparatus 600 includes a plurality of LPARs 1-N, 602 with an operating system AIX, Linux, or IBM i includes VF driver 606. A hypervisor 610 includes a PF adjunct 612 with an error log 614 and an adapter driver 616, an log ID 618, an error logging 619. An SRIOV adapter 620 includes a plurality of PFs 622, and a plurality of VFs 624. A hardware management console (HMC) 630 is coupled to the hypervisor 610 via a field service processor (FSP) 632.

In FIG. 6, a first step is indicated by a line labeled 1 shown in solid line for firmware error log flow, a PF adjunct begins the process of generating a platform error log by issuing an AMC request to the hypervisor to log an error. The PF adjunct 612 provides SRC, severity, action flags, and additional data to the error logging support 619 of the hypervisor 610. Once the error log 614 is generated the log ID 618 is returned to the PF adjunct 612.

A second step is indicated by a line labeled 2, the error logging support 619 of the hypervisor 610 sends the log to the FSP 632 for inclusion in the logging flow. A third step is indicated by a line labeled 3, the FSP 632 sends the log to the HMC 630. A fourth step is indicated by a line labeled 4, the FSP 632 sends the log back to the hypervisor 610 for full broadcast. A next fifth step indicated by lines labeled 5, the error logging support 619 of the hypervisor 610 sends the log to all active partitions 602. An optional sixth step indicated by a line labeled 6 shown in dotted line for Resource Monitoring and Control (RMC) connection, the HMC 630 may pull platform error from platform operating systems using the RMC connection. This provides a redundant path for receiving platform error logs. An optional seventh step indicated by a line labeled 7 shown in dashed line for Hypervisor Call (HCALL) interface, the partition 602 can retrieve the error log ID 618 from the hypervisor 610.

Figure 7:
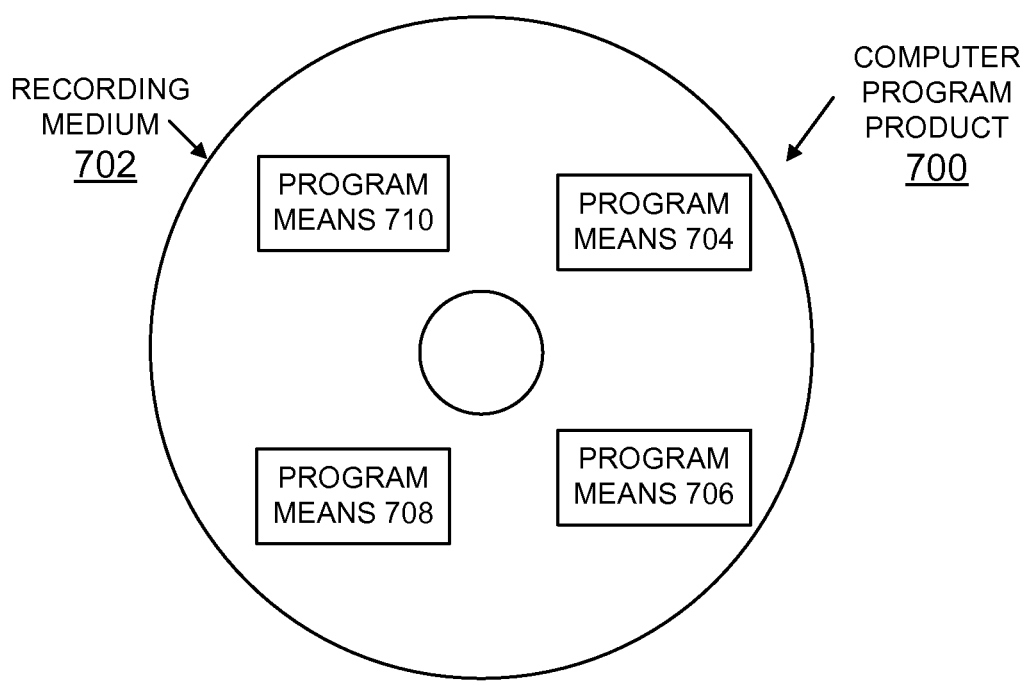
FIG. 7 is a block diagram illustrating a computer program product in accordance with the preferred embodiment.

Referring now to FIG. 7, an article of manufacture or a computer program product 700 of the invention is illustrated. The computer program product 700 is tangibly embodied on a non-transitory computer readable storage medium that includes a recording medium 702, such as, a floppy disk, a high capacity read only memory in the form of an optically read compact disk or CD-ROM, a tape, or another similar computer program product. Recording medium 702 stores program means 704, 706, 708, and 710 on the medium 702 for carrying out the methods for implementing enhanced error collection for an I/O adapter, such as a Single Root Input/Output Virtualization (SRIOV) adapter of a preferred embodiment in the system 100 of FIG. 1, or system 200 of FIG. 2.

A sequence of program instructions or a logical assembly of one or more interrelated modules defined by the recorded program means 707, 706, 708, and 710, direct the computer system 700 for implementing enhanced error collection for the I/O adapter.

While the present invention has been described with reference to the details of the embodiments of the invention shown in the drawing, these details are not intended to limit the scope of the invention as claimed in the appended claims.

What is claimed is:

1. A method for implementing enhanced error collection for an input/output (I/O) adapter in a computer system, the I/O adapter being partitioned into multiple Partitionable Endpoints, with each Partitionable Endpoint (PE) corresponding to a function, and including an adapter PE associated with the I/O adapter, and multiple virtual function (VF) PEs, said method comprising:

responsive to an error of the I/O adapter, freezing the adapter PE;

freezing each of the multiple VF PEs associated with the adapter, responsive to freezing the adapter PE;

informing an adapter driver and each of a plurality of VF device drivers of the error, and said adapter driver and each of said plurality of VF device drivers starting recovery; each of said plurality of VF device drivers loops attempting to unfreeze respective VF PEs, and locking out said plurality of VF device drivers, enabling adapter recovery to successfully complete; responsive to completed adapter recovery, said plurality of VF device drivers unfreeze respective VF PEs and said plurality of VF device drivers commences recovery.

2. The method as recited in claim 1, wherein the I/O adapter includes a Single Root Input/Output Virtualization (SRIOV) adapter.

3. The method as recited in claim 1, includes said adapter driver unfreezing the adapter PE, collecting error data, and starting recovery and reinitialization, and each of the multiple VF PEs remaining frozen.

4. The method as recited in claim 3, includes said adapter driver recovering the I/O adapter, and restoring a configuration of the I/O adapter.

5. The method as recited in claim 4, includes the adapter driver providing permission to unfreeze of each of the multiple VF PEs, and each of said plurality of VF device drivers commence recovery.

6. The method as recited in claim 1, includes said multiple VF device drivers unfreezing each of the multiple VF PE responsive to receiving permission to unfreeze of the VF PEs, and said plurality of VF device drivers commence recovery.

7. The method as recited in claim 6, includes each said VF device driver collecting error data.

8. The method as recited in claim 6, includes each said VF device driver completing recovery, and logging error data.

9. The method as recited in claim 8, includes each of said plurality of VF device drivers resuming normal VF and I/O operations.

10. The method as recited in claim 1, includes a system hypervisor being notified of the adapter PE and the multiple VF PEs being frozen, and said system hypervisor informing said adapter driver and said plurality of VF device drivers of the error.

11. The method as recited in claim 10, includes said adapter driver and each of said plurality of VF device drivers asynchronously starting recovery responsive to being informed of the error by said system hypervisor.

12. A system for implementing enhanced error collection for an input/output (I/O) adapter in a computer system, the I/O adapter being partitioned into multiple Partitionable Endpoints, with each Partitionable Endpoint (PE) corresponding to a function, and including an adapter PE associated with the I/O adapter, and multiple virtual function (VF) PEs, said system comprising:
- a processor;
- a hypervisor managing functions associated with the hardware I/O adapter;
- said processor using said hypervisor to perform the steps of:
- responsive to an error of the I/O adapter, freezing the adapter PE;
- freezing each of the multiple VF PEs associated with the adapter, responsive to freezing the adapter PE;
- informing an adapter driver and each of a plurality of VF device drivers of the error, and said adapter driver and each of said plurality of VF device drivers starting recovery; each of said plurality of VF device drivers loops attempting to unfreeze respective VF PEs, and
- locking out each of said plurality of VF device drivers, enabling adapter recovery to successfully complete; responsive to completed adapter recovery, said plurality of VF device drivers unfreeze respective VF PEs and said plurality of VF device drivers commences recovery.

13. The system as recited in claim 12, wherein the I/O adapter includes a Single Root Input/Output Virtualization (SRIOV) adapter.

14. The system as recited in claim 12, includes said adapter driver unfreezing the adapter PE, collecting error data, and starting recovery and reinitialization, and each of the multiple VF PEs remaining frozen.

15. The system as recited in claim 14, includes said adapter driver recovering the I/O adapter, and restoring a configuration of the I/O adapter.

16. The system as recited in claim 15, includes the adapter driver providing permission to unfreeze each of the multiple VF PEs, and each of said plurality of VF device drivers commence recovery.

17. The system as recited in claim 12, includes said multiple VF device drivers unfreezing the VF PEs responsive to receiving permission to unfreeze of the multiple VF PEs, and each of said plurality of VF device drivers commence recovery.

18. The system as recited in claim 17, includes each said VF device driver completing recovery, and logging error data.

19. The system as recited in claim 18, includes each of said plurality of VF device drivers resuming normal VF and I/O operations, responsive to completing recovery.

20. The system as recited in claim 12, includes said adapter driver and each of said plurality of VF device drivers asynchronously starting recovery responsive to being informed of the error.

* * * * *